(12) United States Patent
Sato

(10) Patent No.: US 12,720,623 B2
(45) Date of Patent: Aug. 25, 2026

(54) NON-TRANSITORY COMPUTER-READABLE RECORDING MEDIUM STORING COMPUTER-READABLE INSTRUCTIONS FOR TERMINAL DEVICE, TERMINAL DEVICE AND CONTROL METHOD FOR TERMINAL DEVICE

(71) Applicant: BROTHER KOGYO KABUSHIKI KAISHA, Nagoya (JP)

(72) Inventor: Hirokazu Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 961 days.

(21) Appl. No.: 17/825,227

(22) Filed: May 26, 2022

(65) Prior Publication Data

US 2022/0386398 A1 Dec. 1, 2022

(30) Foreign Application Priority Data

May 27, 2021 (JP) ................................ 2021-089230

(51) Int. Cl.

*H04W 76/14* (2018.01)
*H04W 8/00* (2009.01)
*H04W 12/06* (2021.01)

(52) U.S. Cl.

CPC .......... *H04W 76/14* (2018.02); *H04W 8/005* (2013.01); *H04W 12/06* (2013.01)

(58) Field of Classification Search

CPC ..... H04W 76/14; H04W 8/005; H04W 12/06; H04W 12/069; H04W 12/50; H04W 48/20; H04W 84/12; H04W 48/16

See application file for complete search history.

(56) References Cited

U.S. PATENT DOCUMENTS

2010/0260069 A1* 10/2010 Sakamoto ............ H04L 63/061 370/254
2014/0298482 A1* 10/2014 Suzuki .................... G06F 21/51 726/27

(Continued)

FOREIGN PATENT DOCUMENTS

JP 2017-184169 A 10/2017
JP 2018-191252 A 11/2018
JP 2021-057804 A 4/2021

*Primary Examiner* — Mandish K Randhawa

(74) *Attorney, Agent, or Firm* — Scully, Scott, Murphy & Presser, P.C.

(57) ABSTRACT

A computer-readable instructions may cause the terminal device to: search for one or more communication device to receive, from each of the one or more communication devices, device information indicating the corresponding communication device; supply target device information to the OS program, wherein the OS program executes an establishing process using the target device information, the establishing process using the target device information including establishing a target connection with a target communication device; and in a case where target access point information is selected, supply the target access point information to the OS program, wherein the OS program obtains target wireless profile for connecting to a target wireless network formed by a target access point; and sends the obtained target wireless profile to the target communication device by using the established target connection.

20 Claims, 6 Drawing Sheets

(56) References Cited

U.S. PATENT DOCUMENTS

| | | | | |
|---|---|---|---|---|
| 2017/0289393 | A1 | 10/2017 | Yokoyama et al. | |
| 2018/0332634 | A1 | 11/2018 | Kawaura | |
| 2019/0020783 | A1 | 1/2019 | Yokoyama et al. | |
| 2020/0084313 | A1* | 3/2020 | Koizumi ............ | H04N 1/00411 |
| 2020/0162633 | A1* | 5/2020 | Ikeda ................. | H04N 1/32776 |
| 2020/0186669 | A1 | 6/2020 | Yokoyama et al. | |
| 2021/0112177 | A1 | 4/2021 | Yokoyama et al. | |

* cited by examiner

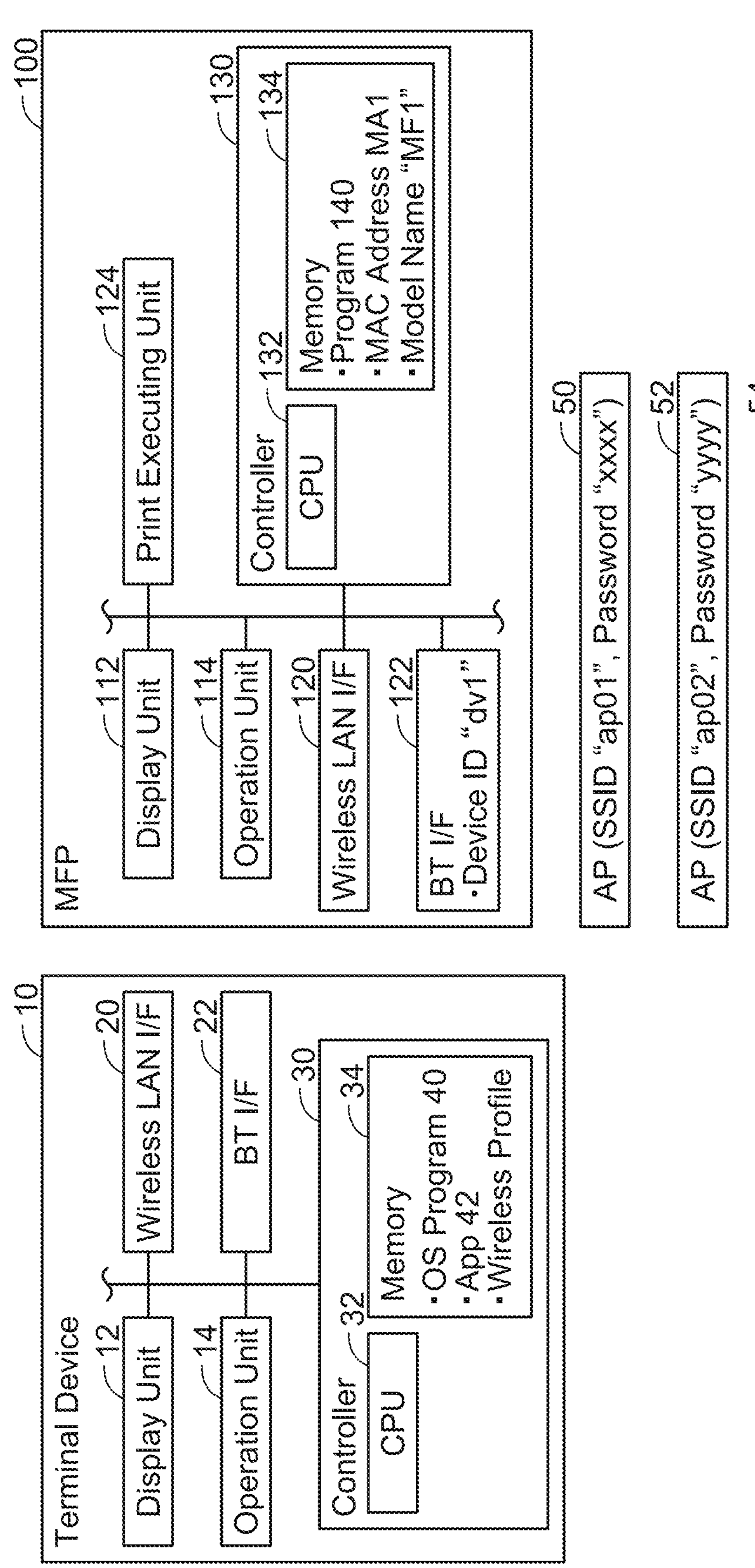
FIG. 2
Terminal Device
10
Display Unit
12
Operation Unit
14
Wireless LAN I/F
20
BT I/F
22
Controller
30
CPU
32
Memory
·OS Program 40
·App 42
·Wireless Profile
34
MFP
100
Display Unit
112
Operation Unit
114
Wireless LAN I/F
120
BT I/F
·Device ID "dv1"
122
Print Executing Unit
124
Controller
130
CPU
132
Memory
·Program 140
·MAC Address MA1
·Model Name "MF1"
134
AP (SSID "ap01", Password "xxxx")
50
AP (SSID "ap02", Password "yyyy")
52
AP (SSID "ap03", Password "zzzz")
54

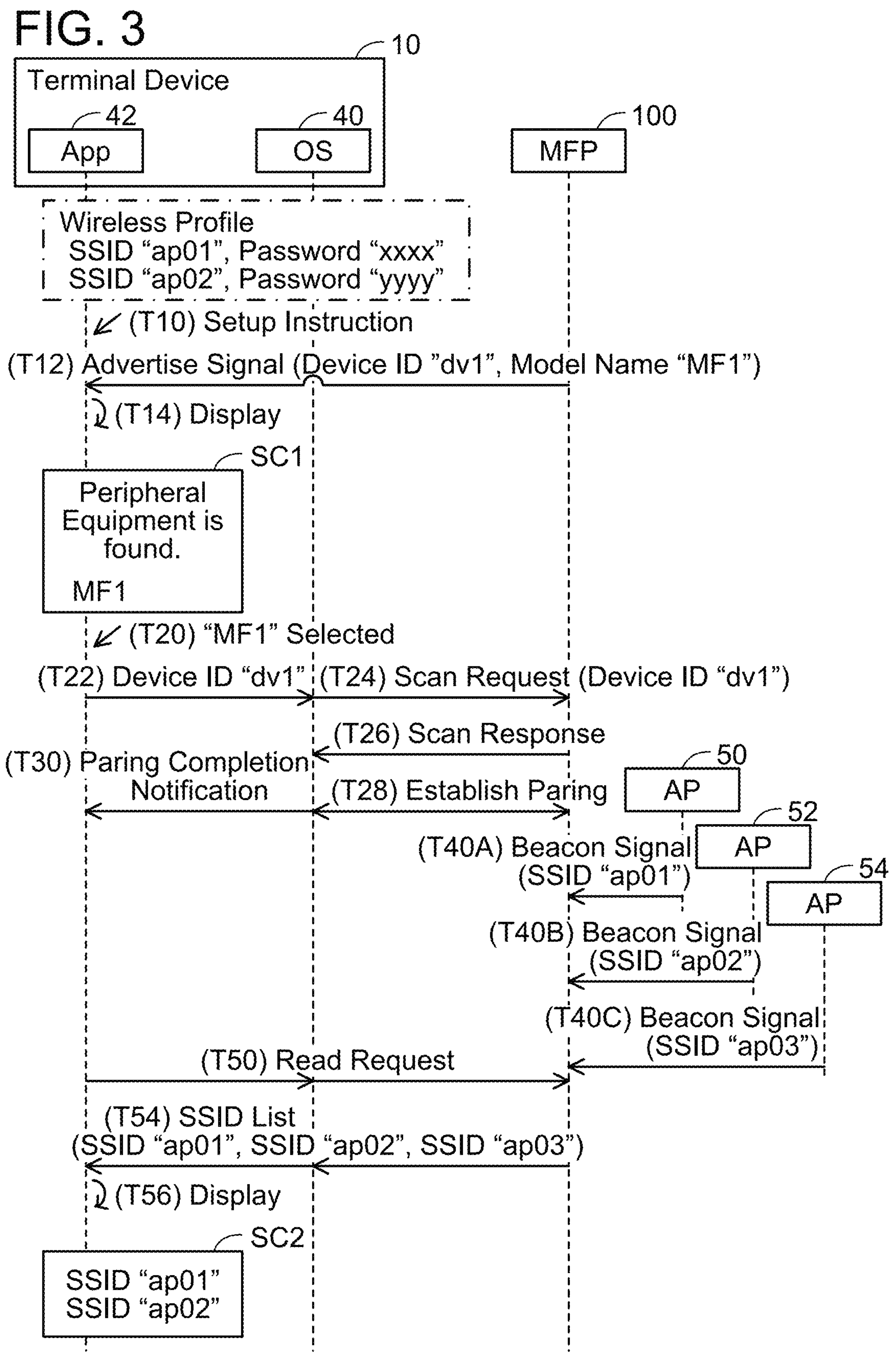
FIG. 3
10
Terminal Device
42
App
40
OS
100
MFP
Wireless Profile
SSID "ap01", Password "xxxx"
SSID "ap02", Password "yyyy"
(T10) Setup Instruction
(T12) Advertise Signal (Device ID "dv1", Model Name "MF1")
(T14) Display
SC1
Peripheral Equipment is found.
MF1
(T20) "MF1" Selected
(T22) Device ID "dv1"
(T24) Scan Request (Device ID "dv1")
(T26) Scan Response
(T30) Paring Completion Notification
(T28) Establish Paring
50
AP
52
AP
54
AP
(T40A) Beacon Signal (SSID "ap01")
(T40B) Beacon Signal (SSID "ap02")
(T40C) Beacon Signal (SSID "ap03")
(T50) Read Request
(T54) SSID List (SSID "ap01", SSID "ap02", SSID "ap03")
(T56) Display
SC2
SSID "ap01"
SSID "ap02"

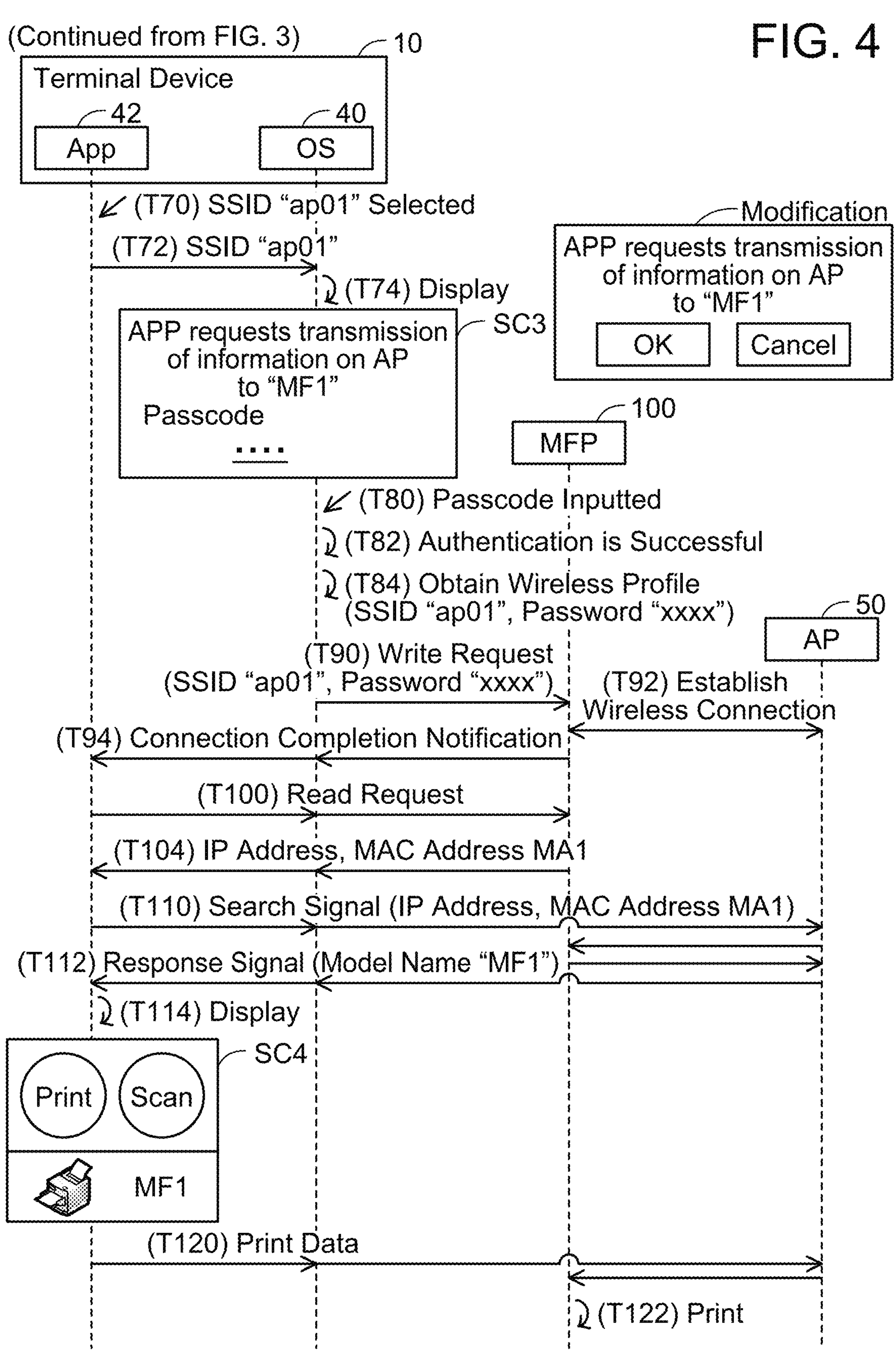

FIG. 4
(Continued from FIG. 3)
10
Terminal Device
42
App
40
OS
(T70) SSID "ap01" Selected
(T72) SSID "ap01"
(T74) Display
APP requests transmission of information on AP to "MF1"
Passcode
SC3
Modification
APP requests transmission of information on AP to "MF1"
OK
Cancel
100
MFP
(T80) Passcode Inputted
(T82) Authentication is Successful
(T84) Obtain Wireless Profile (SSID "ap01", Password "xxxx")
50
AP
(T90) Write Request (SSID "ap01", Password "xxxx")
(T92) Establish Wireless Connection
(T94) Connection Completion Notification
(T100) Read Request
(T104) IP Address, MAC Address MA1
(T110) Search Signal (IP Address, MAC Address MA1)
(T112) Response Signal (Model Name "MF1")
(T114) Display
SC4
Print
Scan
MF1
(T120) Print Data
(T122) Print

FIG. 5

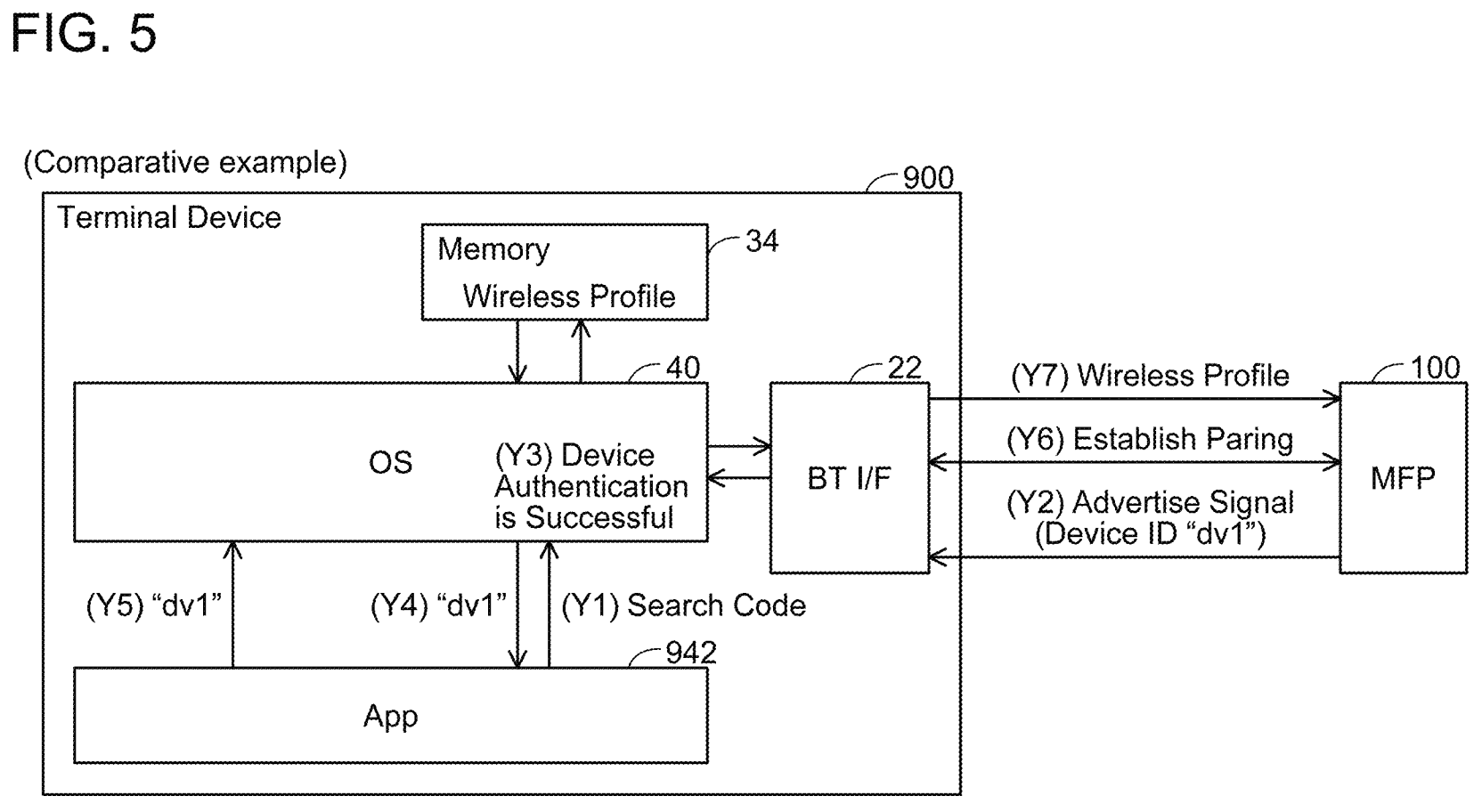

(Comparative example)

Terminal Device

900

100

MFP

22

BT I/F

34

Memory

Wireless Profile

40

OS

942

App (Y1) Search Code (Y2) Advertise Signal (Device ID "dv1")

(Y3) Device Authentication is Successful (Y4) "dv1"

(Y5) "dv1"

(Y6) Establish Paring (Y7) Wireless Profile

FIG. 6

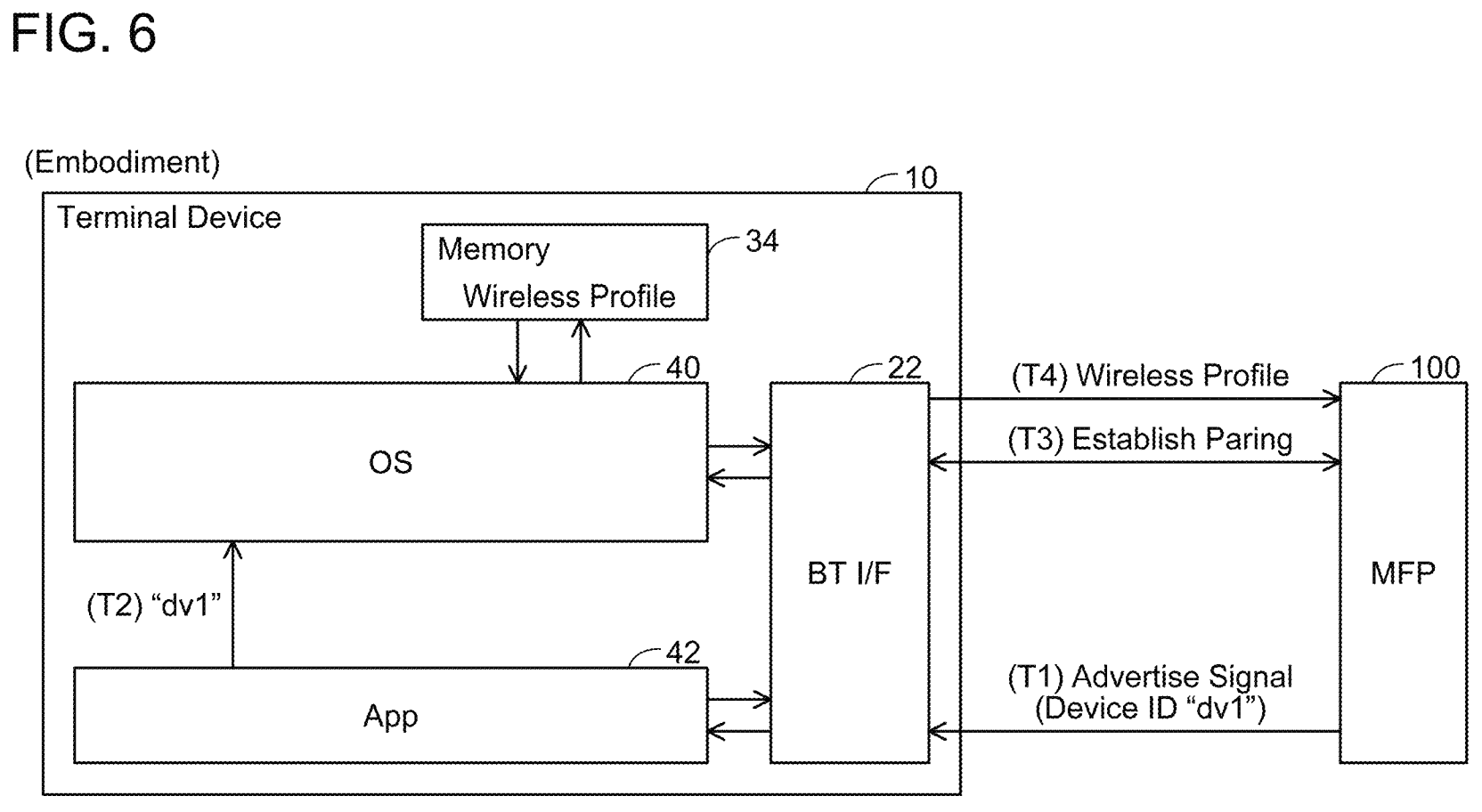

(Embodiment)

Terminal Device

10

Memory
Wireless Profile

34

OS

40

BT I/F

22

(T4) Wireless Profile (T3) Establish Paring

MFP

100

(T2) "dv1"

App

42

(T1) Advertise Signal
(Device ID "dv1")

NON-TRANSITORY COMPUTER-READABLE RECORDING MEDIUM STORING COMPUTER-READABLE INSTRUCTIONS FOR TERMINAL DEVICE, TERMINAL DEVICE AND CONTROL METHOD FOR TERMINAL DEVICE

REFERENCE TO RELATED APPLICATIONS

This application claims priority to Japanese Patent Application No. 2021-089230 filed on May 27, 2021, the contents of which are hereby incorporated by reference into the present application.

BACKGROUND

It is known that an information processing device such as a smartphone sends information (e.g., an SSID and a password) about an external access point to a communication device via a short-distance wireless communication unit.

DESCRIPTION

A smartphone stores an application program and an OS program. Here, information about an external access point may be stored in the smartphone by the OS program. In this case, usage of the information about the external access point by the application program is limited by the OS program. On the other hand, a technique in which an OS program sends information about an external access point has lately been developed.

The present disclosure provides a technique to utilize a sending process in which an OS program sends a wireless profile in a memory of a terminal device to a communication device.

A non-transitory computer-readable recording medium storing computer-readable instructions for a terminal device is disclosed herein.

An OS program of the terminal device may be configured to execute:

a storing process for storing a wireless profile in a memory of the terminal device, the wireless profile being for connecting to a wireless network formed by an access point;

an establishing process for establishing a connection with an external communication device via a wireless interface of the terminal device; and a sending process for sending the wireless profile in the memory to the communication device by using the connection via the wireless interface, wherein the computer-readable instructions, when executed by a processor of the terminal device, may cause the terminal device to:

search for one or more communication devices which exist around the terminal device via the wireless interface and receive, from each of the one or more communication devices, device information indicating the corresponding communication device via the wireless interface;

in a case where a target communication device is selected from among the searched one or more communication devices, supply target device information being the device information indicating the target communication device to the OS program, wherein the OS program executes the establishing process using the target device information, and the establishing process using the target device information includes establishing a target connection being the connection with the target communication device indicated by the target device information via the wireless interface; and in a case where target access point information is selected from among one or more pieces of access point information indicating one or more access points, supply the target access point information to the OS program, and the OS program may execute the sending process using the target access point information, the sending process including:

obtaining, from the memory, target wireless profile that is the wireless profile for connecting to the target wireless network formed by the target access point indicated by the target access point information; and sending the obtained target wireless profile to the target communication device by using the established target connection.

According to such a configuration, the computer-readable instructions cause the terminal device to search for the one or more communication devices and supply the target device information selected from the search result to the OS program. Further, the computer-readable instructions cause the terminal device to supply the target access point information to the OS program. The OS program establishes the target connection with the target communication device by using the target device information, and obtains the target wireless profile from the memory by using the target access point information. Then, the OS program sends the obtained target wireless profile to the target communication device by using the established target connection. With such computer-readable instructions, the sending process in which the OS program sends the wireless profile in the memory of the terminal device to the communication device can be utilized.

The above terminal device itself, a control method for implementing the terminal device, and a computer program for the above terminal device are also novel and useful.

FIG. 2 illustrates block diagrams of a terminal device and a multi-function peripheral;

FIG. 3 illustrates a sequence diagram of a process to connect the multi-function peripheral to a wireless LAN by using the terminal device;

FIG. 4 illustrates continuation of FIG. 3;

FIG. 5 illustrates a conceptual view of a comparative example; and

FIG. 6 illustrates a conceptual view of an embodiment.

FIRST EMBODIMENT

Figure 1:
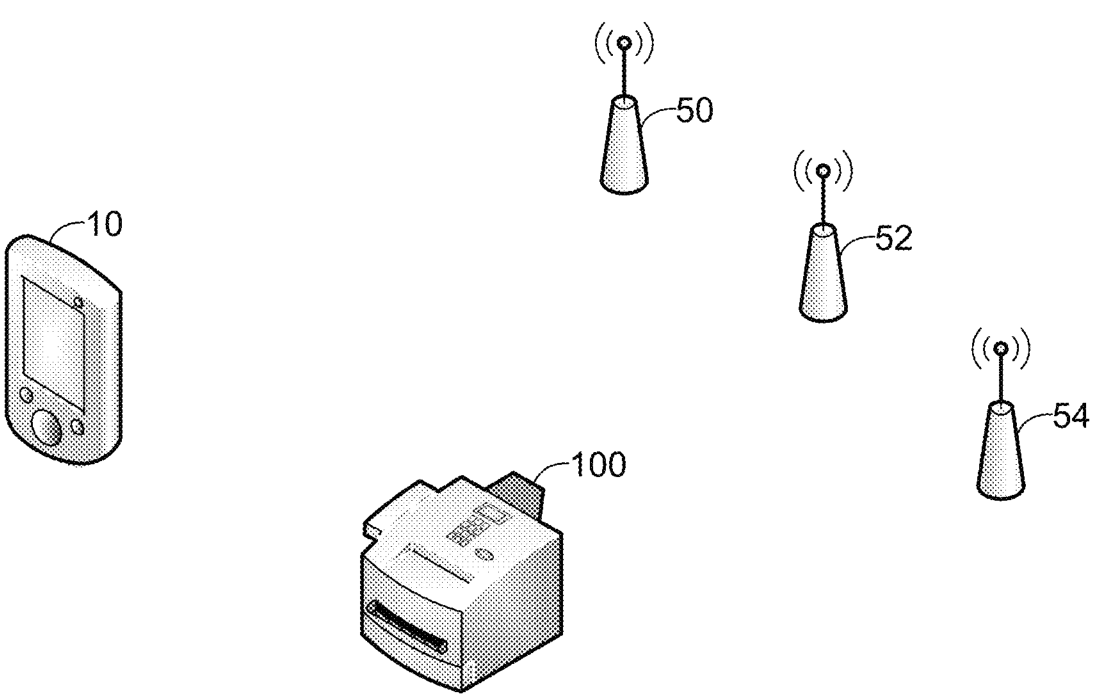
FIG. 1 illustrates a configuration of a communication system.

Configuration of Communication System 2; FIG. 1

As illustrated in FIG. 1, a communication system 2 includes a terminal device 10, a multi-function peripheral 100 (hereafter, the multi-function peripheral will be referred to as "MFP") and three access points 50, 52, 54 (hereafter the access point will be referred to as "AP"). The terminal device 10 is a portable terminal such as a tablet PC and a smartphone. In a variant, the terminal device 10 may be a terminal device such as a desktop PC and a notebook PC.

Each of the APs 50 to 54 forms a wireless Local Area Network (LAN). The terminal device 10 and MFPs (e.g., 100) can connect to any of the wireless LANs formed by the APs 50 to 54. Each AP stores its Service Set Identifier (SSID) and password. For example, the AP 50 stores an SSID "ap01" and a password "xxxx".

Configuration of MFP 100; FIG. 2

The MFP 100 is a peripheral device configured to execute multiple functions including a printing function, a scanning function and a facsimile function (e.g., a peripheral device of the terminal device 10). The MFP 100 includes a display unit 112, an operation unit 114, a wireless LAN interface 120, a Bluetooth ("Bluetooth" is a registered trademark of Bluetooth SIG, Inc) interface 122, a print executing unit 124 and a controller 130. Each unit 112 to 130 is connected to a bus line (reference sign omitted). The print executing unit 124 comprises a printing mechanism of an inkjet scheme, a laser scheme, or the like. Hereafter, an interface will be referred to as "I/F". Further, Bluetooth will be referred to as "BT".

The display unit 112 is a display for displaying various types of information. The operation unit 114 includes a plurality of keys. A user can input various instructions to the MFP 100 by operating the operation unit 114. The display unit 112 functions as a touchscreen (i.e., the operation unit 114) which accepts instructions from the user. In a variant, the display unit 112 may not function as a touchscreen.

The wireless LAN I/F 120 is an I/F for executing communication via a wireless LAN. The communication via a wireless LAN is for example communication conforming to a Wi-Fi scheme (hereafter referred to as "Wi-Fi communication"). The Wi-Fi scheme is, for example, a wireless communication scheme for executing wireless communication conforming to the standard 802.11 of the Institute of Electrical and Electronics Engineers, Inc. (IEEE) and standards complying therewith (such as 802.11a, 11b, 11g, 11n, 11ac, etc.).

The BT I/F 122 is an I/F for executing wireless communication conforming to a BT scheme (hereafter referred to as "BT communication"). The BT scheme is, for example, a wireless communication scheme conforming to the standard 802.15.1 of the IEEE and standards complying therewith. More specifically, the BT I/F 122 supports Bluetooth Low Energy (BLE). The BLE is a standard implemented from version 4.0 of the BT scheme. The BT I/F 122 can execute wireless communication conforming to the BLE (hereafter referred to as "BLE communication"). The BT I/F 122 stores a device ID "dv1" to identify the BT I/F 122.

Differences between the Wi-Fi scheme and the BT scheme will be described. A communication speed of the Wi-Fi communication (e.g., maximum communication speed being 600 Mbps) is faster than a communication speed of the BT communication (e.g., maximum communication speed being 24 Mbps). A frequency of a carrier wave in the Wi-Fi communication is in the 2.4 GHz band or the 5.0 GHz band. A frequency of a carrier wave in the BT communication is in the 2.4 GHz band. In other words, when the 5.0 GHz band is used as the frequency of the carrier wave in the Wi-Fi communication, the frequency of the carrier wave in the Wi-Fi communication and the frequency of the carrier wave in the BT communication are different. Further, a maximum distance by which the Wi-Fi communication can be executed (e.g., about 100 meters) is greater than a maximum distance by which the BT communication can be executed (e.g., about several tens of meters).

The controller 130 includes a CPU 132 and a memory 134. The CPU 132 is configured to execute various processes in accordance with a program 140 stored in the memory 134. The memory 134 is configured of a volatile memory, a nonvolatile memory, and the like.

A model name of the MFP 100 is "MF1", and a MAC address MA1 is assigned to the MFP 100. The model name "MF1" and the MAC address MA1 are stored in the memory 134.

Configuration of Terminal Device 10; FIG. 2

The terminal device 10 includes a display unit 12, and operation unit 14, a wireless LAN I/F 20, a BT I/F 22, and a controller 30. Each of the units 12 to 30 is connected to a bus line (reference sign omitted).

The display unit 12 is a display for displaying various types of information, and the operation unit 14 is for example a touch screen. The operation unit 14 is configured to accept various types of instructions.

The controller 30 includes a CPU 32 and a memory 34. The CPU 32 executes various processes in accordance with programs 40, 42 stored in the memory 34. The memory 34 is configured of a volatile memory, a nonvolatile memory, and the like. An Operating System (OS) program 40 (hereafter referred to as "OS 40") is a program for executing basic processes of the terminal device 10. The application program 42 (hereafter referred to as "app 42") is a program for connecting an MFP (e.g., 100) to a wireless LAN.

The OS 40 is configured to execute a process for connecting to a wireless LAN (hereafter referred to as "LAN connecting process") and a process for establishing pairing with an external device via the BT I/F 22 (hereafter referred to as "pair establishing process"). The LAN connecting process includes a process for executing communication to connect to a wireless LAN via the wireless LAN I/F 20 and a process for storing a wireless profile to connect to this wireless LAN in the memory 34.

Further, the OS 40 is configured to execute a process for sending the wireless profile in the memory 34 to the external device by using the pairing via the BT I/F 22 (hereafter referred to as "profile sending process"). Here, a process for providing an app (e.g., 42) with an entire wireless profile in the memory 34 is restricted by the OS 40. For example, the app 42 cannot obtain a wireless profile from the OS 40 and send the wireless profile to an external device. A process for supplying an SSID included in the wireless profile in the memory 34 is not restricted by the OS 40.

In the present embodiment, the terminal device 10 is currently connected to the wireless LAN formed by the AP 50 (hereafter referred to as "wireless LAN of the AP 50"). Further, the terminal device 10 had previously been connected to the wireless LAN formed by the AP 52 (hereafter referred to as "wireless LAN of the AP 52") in the past. Thus, the memory 34 stores the respective wireless profiles (i.e., Service Set Identifiers (SSIDs) and passwords) for connecting to the wireless LANs of the APs 50, 52.

Process for Connecting MFP to Wireless LAN; FIG. 3, FIG. 4

With reference to FIG. 3, FIG. 4, a process implemented by the communication system 2 will be described. Specifically, FIG. 3 and FIG. 4 illustrate a case in which the MFP 100 is to be connected to the wireless LAN formed by the AP 50 by using the terminal device 10.

In the following descriptions, for easier understanding, a process executed by the CPU 32 of the terminal device 10 in accordance with the OS 40 will be described with the OS 40 as a subject of the process instead of describing the CPU

32 as the subject of the process. Further, a process executed by the CPU 32 in accordance with the app 42 will also be described with the app 42 as a subject of the process. A process executed by the CPU 132 of the MFP 100 will be described with the MFP 100 as a subject of the process instead of describing the CPU 132 as a subject of the process.

In the initial stage of the present case, power of the MFP 100 is already turned on. Triggered by the power being turned on, the MFP 100 starts broadcasting Advertise signals conforming to the BLE via the BT I/F 122. This Advertise signal includes the device ID "dv1" identifying the BT I/F 122 and the model name "MF1" of the MFP 100.

Further, in the initial stage of the present case, the app 42 is already activated. In T10, the user inputs a setup instruction on the operation unit 14 to connect to a wireless LAN of the terminal device 10. Consequently, the app 42 searches for one or more MFPs which exist around the terminal device 10 via the BT I/F 22. Specifically, the app 42 monitors the Advertise signals being received via the BT I/F 22. In the present case, since the power of the MFP 100 is turned on, the app 42 receives the Advertise signal from the MFP 100 via the BT I/F 100 in T12. In a variant, the app 42 may monitor receipt of other signals conforming to the BLE (e.g., Scan request).

In T14, the app 42 causes the display unit 12 to display a screen SC1 including a list of a search result for MFP(s) existing around the terminal device 10. This list includes one or more model names included in the one or more Advertise signals that have been received. In the present case, the app 42 receives one Advertise signal from one MFP 100. Thus, the list includes the model name "MF1" of the MFP 100.

In T20, the app 42 accepts, via the operation unit 14, an instruction for selecting the model name "MF1" from the list in the screen SC1.

In T22, the app 42 supplies the OS 40 with the device ID "dv1" included in the Advertise signal corresponding to the model name "MF1" selected in T20 by using an Application Programming Interface (API) of the OS 40. For example, a provider of the OS 40 publishes codes for the LAN connecting process, the pair establishing process and the profile sending process of the API of the OS 40. In T22, the code for the pair establishing process is used.

When the OS 40 obtains the device ID "dv1" from the app 42 in T22, the OS 40 executes the pair establishing process using the device ID "dv1" in T24 to T30.

In T24, the OS 40 unicasts a Scan request conforming to the BLE via the BT I/F 22. This Scan request is addressed to the BT I/F 122 of the MFP 100 indicated by the device ID "dv1" obtained in T22. Consequently, in T26, the OS 40 receives a Scan response which is a response to the Scan request from the BT I/F 122 of the MFP 100 via the BT I/F 22.

In T28, the OS 40 executes authentication using a PIN code and the like via the BT I/F 22 to establish pairing with the BT I/F 122 of the MFP 100.

In T30, the OS 40 supplies, to the app 42, a pairing completion notification which indicates that establishment of the pairing has been completed.

On the other hand, when the pairing has been established with the terminal device 10 in T28, the MFP 100 searches for AP(s) existing around the MFP 100. In the present case, there are three APs 50 to 54 around the MFP 100. Thus, in T40A to T40C, the MFP 100 receives a beacon signal from each of the three APs 50 to 54 via the wireless LAN I/F 120. The beacon signal is a signal which each of the APs broadcasts, and includes an SSID of the corresponding AP (e.g., an SSID "ap01" of the AP 50).

When the app 42 obtains the pairing completion notification from the OS 40 in T30, the app 42 supplies a Read request in T50 to the OS 40 using the API of the OS 40. Consequently, the OS 40 sends, to the MFP 100, using the pairing of T28 via the BT I/F 22, the Read request which requests for the search result of T40A to T40C.

In T54, the OS 40 receives, from the MFP 100, using the pairing of T28 and via the BT I/F 22, an SSID list which is the search result as a response to the Read request of T50, and supplies the SSID list to the app 42. This SSID list includes three SSIDs "ap01", "ap02", "ap03" of the three APs 50 to 54.

In the present case, two SSIDs "ap01", "ap02" are stored in the memory 34 of the terminal device 10 as the wireless profile, whereas the SSID "ap03" is not stored. The app 42 removes, from the SSID list obtained in T54, the SSID "ap03" which is not stored as the wireless profile in the memory 34. Then, in T56, the app 42 causes the display unit 12 to display a screen SC2 including a list of the two SSIDs "ap01", "ap02". In other words, among the three APs 50 to 54 existing around the terminal device 10, the list of the SSIDs of the two APs 50, 52 which have previously established a connection with the terminal device 10 in the past is displayed.

For example, a comparative example is assumed in which the processes of T40A to T54 are not executed and the app 42 displays a screen including a list of the two SSIDs "ap01", "ap02" stored in the memory 34. In this comparative example, for example, when the AP 52 does not exist around the MFP 100, the SSID "ap02" of the AP 52 is displayed. In this case, if the SSID "ap02" is selected, connection of the MFP 100 to the wireless LAN may fail due to the AP 52 not existing around the MFP 100. Contrary to this, according to the configuration of the present embodiment, the app 42 receives, from the MFP 100, the search result provided by the MFP 100 (T54) and display the screen SC2 by using the search result (T56). In other words, SSID(s) of AP(s) not existing around the MFP 100 are not displayed. Failure of connection of the MFP 100 to a wireless LAN can be prevented. In a variant, the configuration of the above comparative example may be employed.

The app 42 receives, from the MFP 100, using the pairing of T28, the search result provided by the MFP 100 (T54). The pairing of T28 is pairing to be used in the profile sending process by the OS 40. In the present embodiment, the pairing to be used in the profile sending process by the OS 40 can also be utilized in receiving the search result provided by the MFP 100.

In T70 of FIG. 4 that follows, the app 42 accepts, via the operation unit 14, an instruction to select the SSID "ap01" of the AP 50 from the list in the screen SC2.

In T72, the app 42 supplies the SSID "ap01" selected in T70 to the OS 40 by using the code for the profile sending process of the API of the OS 40.

When the OS 40 obtains the SSID "ap01" from the app 42 in T72, the OS 40 executes the profile sending process using the SSID "ap01" in T74 to T94.

In T74, the OS 40 causes the display unit 112 to display a screen SC3 for inquiring the user about execution of the profile sending process. The screen SC3 includes an input box to input a passcode for the OS 40 to authenticate the user. In a variant, the screen SC3 may include a message requesting execution of biometric authentication (e.g., fingerprint authentication, face authentication).

In T80, the OS 40 accepts an operation for inputting a passcode in the input box in the screen SC3 via the operation unit 14. In the present case, in T82, authentication of the passcode inputted in T80 succeeds. When the authentication of the passcode succeeds, the OS 40 executes processes from T84. If the authentication of the passcode fails, the OS 40 does not execute the processes from T84. With such a configuration, the execution of the profile sending process contrary to the user's intention can be prevented.

In T84, the OS 40 obtains the wireless profile including the SSID "ap01" obtained in T72 from the memory 34.

In T90, the OS 40 sends, to the MFP 100, using the pairing of T28 of FIG. 3 and via the BT I/F 22, a Write request including the wireless profile (i.e., the SSID "ap01" and the password "xxxx") obtained in T84. Consequently, in T92, the MFP 100 establishes a wireless connection with the AP 50 by using the wireless profile received in T90. In other words, the MFP 100 is connected to the wireless LAN formed by the AP 50.

When the MFP 100 has established the wireless connection with the AP 50 in T92, the MFP 100 sends a connection completion notification in T94 to the terminal device 10 using the pairing of T28 of FIG. 3 and via the BT I/F 122. The connection completion notification indicates that the MFP 100 has been connected to the wireless LAN of the AP 50. This connection completion notification is supplied to the app 42 via the OS 40.

When the app 42 obtains the connection completion notification from the OS 40 in T94, the app 42 executes a process of T100. T100 is the same as T50, T52 except that a Read request which requests for the IP address and the MAC address MA1 of the MFP 100 is used. This IP address is assigned to the MFP 100 by the AP 50 in T92.

In T104, the app 42 receives the IP address and the MAC address MA1 of the MFP 100 from the MFP 100 using the pairing of T28 of FIG. 3 and via the BT I/F 22 and the OS 40 as a response to the Read request of T102. With such a configuration, the pairing used in the profile sending process by the OS 40 can also be utilized in receiving the IP address and the MAC address MA1 of the MFP 100.

In T110, the app 42 sends a search signal that searches for the MFP 100 connected to the wireless LAN formed by the AP 50 using the API of the OS 40 and via the wireless LAN I/F 20. This search signal includes the information obtained in T104 (i.e., the IP address and the MAC address MA1 of the MFP 100). This search signal is received by the MFP 100 using the wireless connection between the terminal device 10 and the AP 50 and the wireless connection between the MFP 100 and the AP 50. This search signal is unicasted.

In T112, the app 42 receives a response signal in response to the search signal of T110 from the MFP 100 via the wireless LAN I/F 20 and the OS 40. This search signal includes the model name "MF1" of the MFP 100.

In T114, the app 42 stores, in the memory 34, the information received in T104 (i.e., the IP address and the MAC address MA1 of the MFP 100) and the model name "MF1" received in T112 as information indicating the MFP 100 to be controlled. Then, the app 42 causes the display unit 12 to display a screen SC4 for accepting an instruction to execute a printing function, a scanning function, and the like. The screen SC4 includes the model name "MF1" indicating the MFP 100 to be controlled.

When the app 42 accepts selection of a "Print" button in the screen SC4, the app 42 supplies print data indicating an image to be printed to the OS 40 by using the API of the OS 40 in T120. Consequently, the OS 40 sends, to the MFP 100, the print data indicating the image to be printed via the wireless LAN I/F 20 and the AP 50 and using the wireless LAN formed by the AP 50.

When the MFP 100 receives the print data from the terminal device 10 via the AP 50 and the wireless LAN I/F 120 in T120, the MFP 100 causes the print executing unit 124 to execute printing of the image indicated by the print data in T122.

Effect of Present Embodiment

According to the configuration of the present embodiment, the app 42 searches for one or more MFPs and supplies the device ID "dv1" indicating the MFP 100 selected from the search result to the OS 40 (T22 in FIG. 3). Further, the app 42 supplies, to the OS 40, the SSID "ap01" indicating the AP 50 to be connected (T72 of FIG. 4). The OS 40 establishes the pairing with the MFP 100 by using the device ID "dv1" obtained from the app 42 (T28 of FIG. 3) and obtains the wireless profile of the AP 50 from the memory 34 by using the SSID "ap01" obtained from the app 42 (T84 in FIG. 4). Then, the OS 40 sends the obtained wireless profile of the AP 50 to the MFP 100 by using the established pairing. With the app 42 of the present embodiment, the profile sending process provided by the OS 40 can be used.

Further, in the above embodiment, the app 42 receives, via the BT I/F 22, destination information (i.e., the IP address and the MAC address MA1) indicating the address of the MFP 100 which operates as a child station of the wireless LAN of the AP 50 (T104 in FIG. 4). Then, after the execution of the profile sending process, the app 42 executes communication with the MFP 100 via the wireless LAN I/F 20 using the destination information (T110, T120). For example, a comparative example is assumed in which the process of T104 is not executed. In this comparative example, the app 42 receives the destination information from the MFP 100 by, for example, broadcasting a signal searching for a child station of the wireless LAN of the AP 50 via the wireless LAN I/F 20. In the present embodiment, the destination information can be obtained without execution of such search via the wireless LAN I/F 20. In a variant, the configuration of the above comparative example may be employed.

Other Effects of Present Embodiment; FIG. 5, FIG. 6

Concept of Comparative Example; FIG. 5

Prior to explaining other effects of the present embodiment, a comparative example which uses the profile sending process by the OS 40 will be explained with reference to FIG. 5. In Y1, an app 942 of a terminal device 900 of the comparative example supplies, to the OS 40, a search code of the API of the OS 40. Here, the search code is a code for causing the OS 40 to execute searching of the Advertise signal via the BT I/F 22 and obtaining information in the Advertise signal from the OS 40.

In Y2, the OS 40 receives the Advertise signal including the device ID "dv1" from the MFP 100 in accordance with the search code of Y1. Here, only device(s) authenticated by the OS 40 is (are) allowed to obtain the information using the search code. In this comparative example, in Y3, authentication of the device ID "dv1" in the Advertise signal succeeds. Consequently, in Y4, the app 942 obtains the device ID "dv1" from the OS 40. If the authentication of the device ID "dv1" in the Advertise signal fails, the processes from Y4 are not executed.

In Y5, the app 942 supplies, to the OS 40, using the pair establishing process of the API of the OS 40, the device ID "dv1" obtained in Y4. In Y6, the OS 40 executes the pair establishing process using the device ID "dv1" obtained in Y5 and establishes the pairing with the MFP 100. In Y7, the OS 40 executes the profile sending process using the pairing established in Y6 and sends the wireless profile in the memory 34 to the MFP 100.

As indicated in Y3, in the comparative example, sending of the wireless profile to the MFP 100 may fail due to a failure in the authentication of the device ID "dv1".

Concept of Present Embodiment; FIG. 6

In the present embodiment, the app 42 does not execute the process of Y1 of FIG. 5. In other words, in T1, the app 42 executes the search for the Advertise signal via the BT I/F 22 (see T12 of FIG. 3). In T2, the app 42 supplies the device ID "dv1" obtained in the search of T1 to the OS 40 using the code of the pair establishing process of the API of the OS 40 (see T22 of FIG. 3). In T3, the OS 40 executes the pair establishing process using the device ID "dv1" (see T28 of FIG. 3). In T4, the OS 40 executes the profile sending process using the pairing established in T3 and sends the wireless profile in the memory 34 to the MFP 100 (T90 of FIG. 4). According to the configuration of the present embodiment, the profile sending process by the OS 40 can be utilized without execution of the process of Y3 of the comparative example of FIG. 5. A failure in sending of the wireless profile in the memory 34 to the MFP 100 can be prevented.

Corresponding Relationships

The terminal device 10, the app 42, the OS 40, the memory 34, and the BT I/F 22 are an example of "terminal device", "computer-readable instructions", "OS program", "memory" and "wireless interface", respectively. The LAN connecting process, the pair establishing process and the profile sending process are an example of "storing process", "establishing process" and "sending process". The MFP 100 is an example of "one or more communication devices (and target communication device)". The device ID "dv1" is an example of "device information (target device information) ". The APs 50 to 54 are examples of "one or more access points". The SSIDs "ap01" to "ap03" are examples of "one or more pieces of access point information". The SSID "ap01" and the wireless LAN formed by the AP 50 are an example of "target access point information" and "target wireless network", respectively. The SSID "ap01" and the password "xxxx" are examples of "target wireless profile". The pairing of T28 is an example of "target connection". The wireless connection of T92 of FIG. 4 is an example of "specific connection". The IP address and the MAC address MA1 are examples of "destination information". The operation of T80 in FIG. 4 is an example of "predetermined operation".

T12, T22 of FIGS. 3 and T72 of FIG. 4 are an example of "search for one or more communication device", "supply target device information" and "supply the target access point information", respectively.

(Variant 1) "Communication device" is not limited to the MFP 100, and may be a printer, a scanner, a facsimile machine, a desktop PC, a notebook PC, or the like.

(Variant 2) "Wireless interface" is not limited to the BT I/F 22, and may be, for example, the wireless LAN I/F 20. In a variant in which the "wireless interface" is the wireless LAN I/F 20, the app 42 may receive the device ID "dv1" from the MFP 100 via the wireless LAN I/F 20. Further, instead of the pairing, the OS 40 may establish a wireless connection conforming to Wi-Fi Direct ("Wi-Fi Direct" is a registered trademark of Wi-Fi Alliance) and send the wireless profile using this wireless connection to the MFP 100.

(Variant 3) The process of T54 in FIG. 3 may not be executed. In this variant, "receive the one or more pieces of access point information" may be omitted.

(Variant 4) In the process of T 54 of FIG. 3, the pairing of T28 may not be used. For example, the app 42 may receive the list of the SSIDs from the MFP 100 by using pairing different from the paring of T28 or the Scan response which is a response to the Scan request.

(Variant 5) The processes of T110 to T120 of FIG. 4 may not be executed. In this variant, "execute communication with the target communication device" may be omitted.

(Variant 6) The process of T104 of FIG. 4 may not be executed. In this variant, "receive destination information" may be omitted.

(Variant 7) In the process of T104 of FIG. 4, the pairing of T28 may not be used. For example, the app 42 may receive the IP address and the MAC address MA1 from the MFP 100 using pairing different from that of T28 or the Scan response that is a response to the Scan request.

(Variant 8) "Predetermined operation" is not limited to input of a passcode. For example, in a variant illustrated in FIG. 4, the screen SC3 may include an "OK" button for accepting permission from the user instead of the input box for inputting a passcode. In this variant, the operation to select the "OK" button is an example of "predetermined operation".

(Variant 9) The processes of T74, T80 of FIG. 4 may not be executed. In this variant, "predetermined operation" may be omitted.

(Variant 10) In the above embodiments, the processes of FIG. 3, FIG. 4 are implemented by a software (e.g., programs 40, 42, 140), however, at least one of these processes may be implemented by hardware such as a logic circuit.

What is claimed is:

1. A non-transitory computer-readable recording medium storing computer-readable instructions for a terminal device, wherein an Operating System (OS) program of the terminal device, which is different from the computer-readable instructions, is configured to execute:

storing a wireless profile in a memory of the terminal device, the wireless profile being for connecting to a wireless network formed by an access point;

searching for one or more communication devices which exist around the terminal device via a wireless interface in response to an Application Programming Interface (API) of the OS program receiving a search code, wherein the one or more communication devices found are authenticated by the OS program;

establishing a connection with an external communication device via the wireless interface of the terminal device; and sending the wireless profile in the memory to the external communication device by using the connection via the wireless interface, wherein the computer-readable instructions, when executed by a processor of the terminal device, cause the terminal device to:

search for the one or more communication devices via the wireless interface without supplying the search code to the OS program and receive, from each of the one or more communication devices, device information indicating the corresponding communication device via the wireless interface;

display a screen including the one or more communication devices found by the computer-readable instructions;

in a case where a target communication device is selected from among the one or more communication devices in the screen, supply target device information being the device information indicating the target communication device to the OS program, wherein the OS program establishing the connection using the target device information, as a target connection with the target communication device indicated by the target device information via the wireless interface; and in a case where target access point information is selected from among one or more pieces of access point information indicating one or more access points, supply the target access point information to the OS program, and the OS program obtains, from the memory, target wireless profile that is the wireless profile for connecting to a target wireless network formed by a target access point indicated by the target access point information; and sends the target wireless profile obtained to the target communication device by using the target connection established.

2. The non-transitory computer-readable recording medium as in claim 1, wherein the one or more access points are searched by the target communication device, wherein the computer-readable instructions, when executed by the processor, further cause the terminal device to:

receive the one or more pieces of access point information from the target communication device via the wireless interface.

3. The non-transitory computer-readable recording medium as in claim 2, wherein the one or more pieces of access point information are received from the target communication device by using the target connection.

4. The non-transitory computer-readable recording medium as in claim 2, wherein two or more pieces of access point information including the one or more pieces of access point information are received from the target communication device via the wireless interface, wherein the computer-readable instructions, when executed by the processor, further cause the terminal device to:

remove access point information which is not stored in the memory from the two or more pieces of access point information so as to specify the one or more pieces of access point information from the two or more pieces of access point information, and wherein the target access point information is selected from among the specified one or more pieces of access point information.

5. The non-transitory computer-readable recording medium as in claim 1, wherein the target wireless profile obtained is used for establishing a specific connection between the target communication device and the target access point after the sending the target wireless profile obtained, wherein the computer-readable instructions, when executed by the processor, further cause the terminal device to:

execute communication with the target communication device by using a connection between the terminal device and the target access point and the specific connection between the target communication device and the target access point.

6. The non-transitory computer-readable recording medium as in claim 5, wherein the computer-readable instructions, when executed by the processor, further cause the terminal device to:

receive destination information indicating an address of the target communication device from the target communication device via the wireless interface, and the communication with the target communication device is executed by using the received destination information.

7. The non-transitory computer-readable recording medium as in claim 1, wherein the target connection is maintained even after the one or more pieces of access point information have been received from the target communication device, the target wireless profile obtained is used for establishing a specific connection between the target communication device and the target access point after the sending the target wireless profile obtained, wherein the computer-readable instructions, when executed by the processor, further cause the terminal device to:

after the specific connection has been established between the target communication device and the target access point, receive destination information indicating an address of the target communication device from the target communication device via the wireless interface by using the target connection; and execute communication with the target communication device indicated by the received destination information by using a connection between the terminal device and the target access point and the specific connection between the target communication device and the target access point.

8. The non-transitory computer-readable recording medium as in claim 1, wherein sending the target wireless profile obtained is triggered by input of a predetermined operation on the terminal device for user authentication.

9. The non-transitory computer-readable recording medium as in claim 1, wherein the wireless interface is an interface for executing wireless communication according to Bluetooth (registered trademark), and the device information is received from the one or more communication devices by receiving, from each of the one or more communication devices, an Advertise signal including the device information and conforming to the Bluetooth.

10. The non-transitory computer-readable recording medium as in claim 1, wherein the OS program is restricted from transferring a full wireless profile to the computer-readable instructions.

11. A terminal device comprising:

a memory storing an OS-Operating System (OS) program and an application program, which is different from the OS program;

a processor; and a wireless interface, wherein the OS program is configured to execute:

storing a wireless profile in a memory of the terminal device, the wireless profile being for connecting to a wireless network formed by an access point;

searching for one or more communication devices which exist around the terminal device via the wireless interface in response to an Application Programming Interface (API) of the OS program receiving a search code, wherein the one or more communication devices found are authenticated by the OS program;

establishing a connection with an external communication device via the wireless interface;

and sending the wireless profile in the memory to the external communication device by using the connection via the wireless interface, wherein the application program, when executed by the processor, cause the terminal device to:

search for the one or more communication devices via the wireless interface without supplying the search code to the OS program and receive, from each of the one or more communication devices, device information indicating the corresponding communication device via the wireless interface;

display a screen including the one or more communication devices found by the application program;

in a case where a target communication device is selected from among the one or more communication devices in the screen, supply target device information being the device information indicating the target communication device to the OS program, wherein the OS program establishes the connection using the target device information, as a target connection with the target communication device indicated by the target device information via the wireless interface; and in a case where target access point information is selected from among one or more pieces of access point information indicating one or more access points, supply the target access point information to the OS program, and the OS program obtains from the memory, target wireless profile that is the wireless profile for connecting to a target wireless network formed by a target access point indicated by the target access point information; and sends the target wireless profile obtained to the target communication device by using the target connection established.

12. A control method for a terminal device, wherein an Operating System (OS) program of the terminal device, which is different from a program implementing the control method, is configured to execute:

storing a wireless profile in a memory of the terminal device, the wireless profile being for connecting to a wireless network formed by an access point;

searching for one or more communication devices which exist around the terminal device via a wireless interface in response to an Application Programming Interface (API) of the OS program receiving a search code, wherein the one or more communication devices found are authenticated by the OS program;

establishing a connection with an external communication device via the wireless interface of the terminal device; and sending the wireless profile in the memory to the external communication device by using the connection via the wireless interface, the control method comprising:

searching for the one or more communication devices via the wireless interface without supplying the search code to the OS program and receiving, from each of the one or more communication devices, device information indicating the corresponding communication device via the wireless interface;

displaying a screen including the one or more communication devices found by the program;

in a case where a target communication device is selected from among the one or more communication devices in the screen, supplying target device information being the device information indicating the target communication device to the OS program, wherein the OS program establishes the connection using the target device information as a target connection with the target communication device indicated by the target device information via the wireless interface; and in a case where target access point information is selected from among one or more pieces of access point information indicating one or more access points, supplying the target access point information to the OS program, and the OS program obtains, from the memory, target wireless profile that is the wireless profile for connecting to a target wireless network formed by a target access point indicated by the target access point information; and sends the target wireless profile obtained to the target communication device by using the target connection obtained.

13. The control method as in claim 12, wherein the one or more access points are searched by the target communication device, wherein the control method further comprises:

receiving the one or more pieces of access point information from the target communication device via the wireless interface.

14. The control method as in claim 13, wherein the one or more pieces of access point information are received from the target communication device by using the target connection.

15. The control method as in claim 13, wherein two or more pieces of access point information including the one or more pieces of access point information are received from the target communication device via the wireless interface, wherein the control method further comprises:

removing access point information which is not stored in the memory from the two or more pieces of access point information so as to specify the one or more pieces of access point information from the two or more pieces of access point information, and wherein the target access point information is selected from among the specified one or more pieces of access point information.

16. The control method as in claim 12, wherein the target wireless profile obtained is used for establishing a specific connection between the target communication device and the target access point after the sending the target wireless profile obtained, wherein the control method further comprises:

executing communication with the target communication device by using a connection between the terminal device and the target access point and the specific connection between the target communication device and the target access point.

17. The control method as in claim 16, wherein the control method further comprises:

receiving destination information indicating an address of the target communication device from the target communication device via the wireless interface, and the communication with the target communication device is executed by using the received destination information.

18. The control method as in claim 12, wherein the target connection is maintained even after the one or more pieces of access point information have been received from the target communication device, the target wireless profile obtained is used for establishing a specific connection between the target communication device and the target access point after the sending the target wireless profile obtained, wherein the control method further comprises:

after the specific connection has been established between the target communication device and the target access point, receiving destination information indicating an address of the target communication device from the target communication device via the wireless interface by using the target connection; and executing communication with the target communication device indicated by the received destination information by using a connection between the terminal device and the target access point and the specific connection between the target communication device and the target access point.

19. The control method as in claim 12, wherein sending the target wireless profile obtained is triggered by input of a predetermined operation on the terminal device for user authentication.

20. The control method as in claim 12, wherein the wireless interface is an interface for executing wireless communication according to Bluetooth (registered trademark), and the device information is received from the one or more communication devices by receiving, from each of the one or more communication devices, an Advertise signal including the device information and conforming to the Bluetooth.

* * * * *